Jan. 26, 1943.  R. L. ANDERSON ET AL  2,309,155
DRAPER FASTENER
Filed April 29, 1940
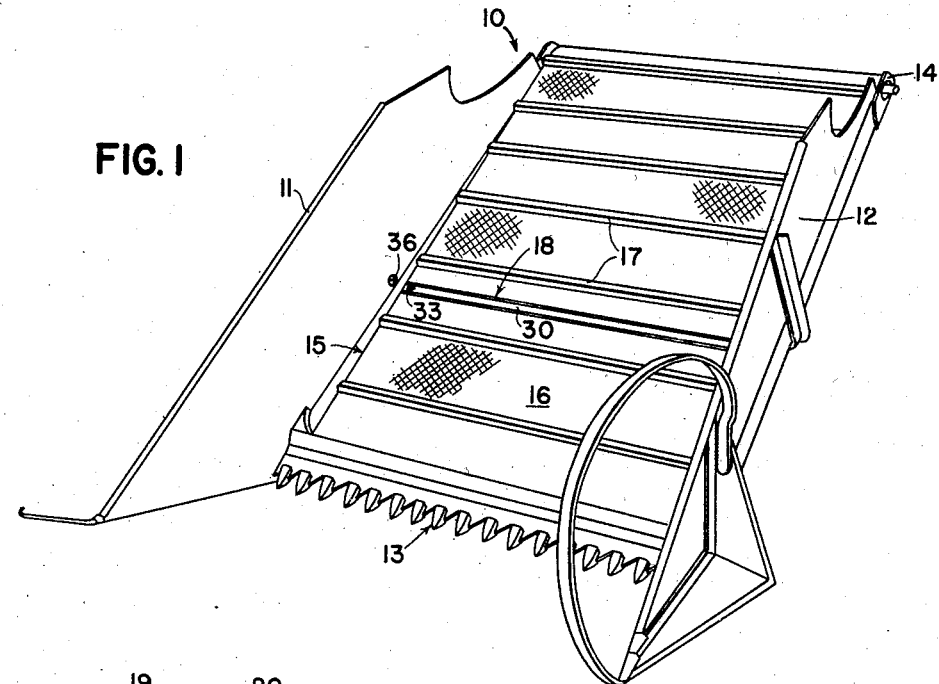
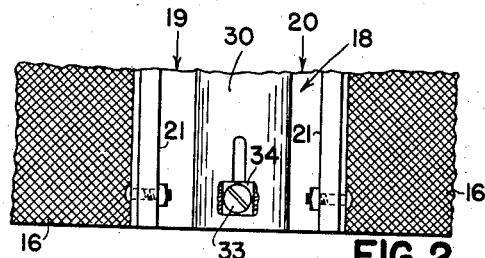
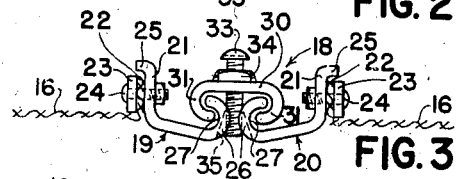
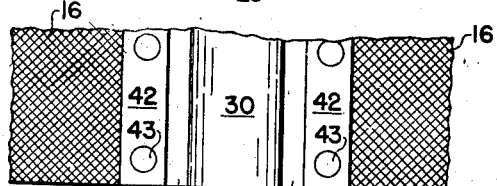
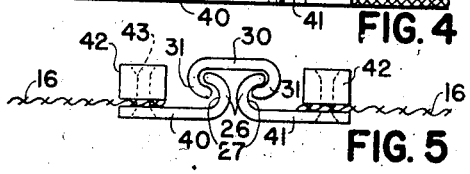
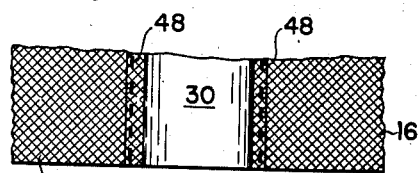
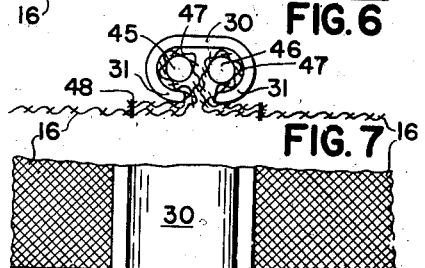
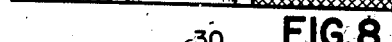
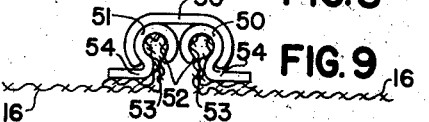
INVENTOR:
RALPH L. ANDERSON, CARL J. FREDERIKSEN,
ELLSWORTH T. JOHNSON, LOUIS A. PARADISE
BY
ATTORNEYS.

Patented Jan. 26, 1943

2,309,155

UNITED STATES PATENT OFFICE 2,309,155

DRAPER FASTENER

Ralph L. Anderson, Carl J. Frederiksen, Ellsworth T. Johnson, and Louis A. Paradise, Moline, Ill., assignors to Deere & Company, Moline, Ill., a corporation of Illinois Application April 29, 1940, Serial No. 332,290

10 Claims. (Cl. 24—31)

The present invention relates generally to flexible endless conveyors and more particularly to fastening means for joining the two ends of a conveyor belt, with particular reference to drapers on agricultural implements such as harvesters and the like. The principal object of our invention relates to the provision of novel and improved means for joining the ends of a draper and a more specific object is concerned with the provision of fastening means which can be quickly and easily installed and removed.

We will now describe several illustrative embodiments of our invention, reference being had to the drawing appended hereto, in which Figure 1 is a perspective view of a harvester platform showing a draper having a fastener embodying the principles of our invention;

Figure 2 is a fragmentary plan view showing one end of a draper fastener embodying the preferred form of our invention;

Figure 3 is an end view of the fastener illustrated in Figure 2;

Figure 4 is a fragmentary plan view showing one end of a modified form of our invention;

Figure 5 is an end elevation of the embodiment of Figure 4;

Figure 6 is a plan view of a second modification of our invention;

Figure 7 is an end elevation of the embodiment of Figure 6;

Figure 8 is a plan view showing the end portion of a third modified form of our invention; and Figure 9 is an end elevation of the embodiment shown in Figure 8.

Referring now to the drawing and more particularly to Figures 1, 2 and 3, reference numeral 10 indicates in its entirety a harvester platform having a pair of laterally spaced side walls 11, 12, and a cutter bar 13 disposed transversely across the front end of the platform. The platform has a pivot bearing 14 for supporting the platform on a harvester body for vertical swinging movement on a transversely extending axis. A draper 15 is movable on the platform between the side walls 11, 12 and is trained over suitable rollers (not shown), one of which is disposed behind the cutter bar and the other of which is journaled for rotation about the axis of vertical pivoting movement of the platform in a manner well known to those skilled in the art. The draper 15 comprises a fabric 16 to which is secured at intervals a plurality of transversely disposed slats 17 preferably made of wood and riveted to the fabric and the ends of the latter are joined by means of a novel fastener, indicated in its entirety by reference numeral 18 and which will now be described.

A pair of metal strips 19, 20 are secured along the two edges of the fabric 16 which are to be joined, and have upwardly extending flanges 21. The edges 22 of the fabric 16 are clamed against the outer surfaces of the flanges 21 by means of clamping members 23 in the form of bars extending along the edges of the fabric and clamped against the flanges 21 by means of suitable bolts 24. The upper edge 25 of each of the flanges 21 is bent outwardly and serves to prevent dirt and foreign material from lodging in the crack between the flange 21 and the clamping bar 23. The inner edges 26 of the strips 19, 20 are curved upwardly and outwardly to provide a pair of abutting surfaces and to provide a pair of juxtaposed beads defining a pair of grooves 27 on the sides of the beads opposite the abutting surfaces.

The strips 19, 20 are detachably connected together by means of a channel-shaped joining member 30 having a pair of downwardly and inwardly turned side portions 31 which are adapted to interlock within the grooves 27 under the upwardly turned flange portions 26 of the strips 19, 20. The joining member 30 is slidable into engagement with the grooves 27 from one end of the strips 19, 20, and is secured in place by means of a bolt 33 which is threaded into a nut 34 welded to the top surface of the joining member 30 and extending downwardly through a pair of notches 35 in the abutting surfaces of the strips 19, 20 and thus preventing sliding movement of the joining member 30 along the grooves 27.

The draper 15 is installed on the platform with the joining member 30 removed, the fabric being trained over the upper and lower rollers and brought together substantially in the center of the platform. The joining member 30 is then inserted through an aperture 36 in the side wall 11 of the platform, and the flanges 31 are then engaged with the grooves 27 after which the joining member 30 can be slid through the aperture 36 into its normal connected position until the bolt 33 is in register with the notches 35, whereupon the bolt can be screwed down into the notches to hold the joining member 30 in connected position. Preferably, the joining member 30 is made in one piece which is equal in length to the width of the draper, although it is possible to make the joining member in two or more pieces and to slide them on one after the other.

Attention is called to the fact that the joint is well protected against stones and other heavy objects by the flanges 21 and clamping bars 23 disposed closely adjacent the joining member 30. This reduces the possibility of damage to the joint by objects falling upon the joining member and bending it out of shape.

The embodiment shown in Figures 4 and 5 is somewhat similar to the embodiment of Figures 2 and 3, with the exception that the connecting strips 40, 41 are not provided with upwardly extending flanges but are clamped against the fabric 16 by means of clamping bars 42, preferably made of wood disposed above the connecting strips 40, 41 and adjacent on opposite sides of the joining member 30. The bars 42 are clamped against the strips 40, 41 by means of suitable bolts or rivets 43. In other respects this embodiment is generally similar to the embodiment shown in Figures 2 and 3, and, therefore, like reference numerals have been applied on similar parts. The securing bolt 33 has been omitted from this embodiment for the sake of drawing simplicity, but it is to be understood that this type of bolt fastening is equally applicable to this embodiment.

In the embodiment shown in Figures 6 and 7, the beads which are engaged by the channel-shaped joining member 30 are formed by inserting a pair of rods 45, 46 through a pair of loops 47 provided in the adjoining edges of the fabric 16 by folding the latter back and stitching the same, as at 48. In this embodiment the joining member 30 is slid over the loops 47 after the rods 45, 46 have been inserted therein, the flanges 31 of the joining member 30 being turned inwardly to embrace the two rods.

In the embodiment of Figures 8 and 9, the the beads comprise a pair of tubular metallic members 50, 51 which extend along the adjoining edges of the fabric and are split longitudinally, as at 52, to receive the folded ends 53 of the fabric 16 over which the tubular members are compressed to clamp the fabric in the slot therein. The outer edge of each of the tubular members 50, 51 is curved outwardly, as at 54, to provide a smooth curved surface against which the tension of the fabric is applied to prevent injury to the latter.

We do not intend our invention to be limited to the exact details shown in the present embodiments, except as limited by the following claims.

We claim:

1. A fastener for joining a pair of edges of a draper, comprising a pair of rigid strips, a pair of clamping members and means for securing one of said members to each of said strips to clamp one of said edges therebetween, and means for interconnecting the adjoining edges of said strips, said clamping members serving to protect said interconnecting means between them against damage by objects falling upon said draper.

2. A fastener for joining a pair of edges of a draper, comprising a pair of metal strips extending along said edges, respectively, and having upwardly turned flange portions, a clamping bar secured to each of said flange portions for clamping therebetween the respective draper edge, and means for interconnecting the adjoining edges of said metal strips.

3. A fastener for joining a pair of edges of a draper, comprising a pair of metal strips extending along said edges, respectively, and having upwardly turned flange portions, a clamping bar secured to each of said flange portions for clamping therebetween the respective draper edge, the adjoining edges of said metal strips being turned away from each other to provide opposed grooves, and a channel shaped joining member slidable from one end of said strips and having edges adapted to interlock with said grooves.

4. The device claimed in claim 3, including the further provision of means for locking said joining member against sliding movement relative to said strips.

5. A fastener for joining a pair of edges of a draper comprising a pair of rods, said draper edges having loops provided to receive said rods, and a joining member adapted to embrace said rods.

6. A fastener for joining a pair of edges of a draper comprising a pair of rods, said draper edges having loops provided to receive said rods, and a channel shaped joining member adapted to slide over said loops and rods for embracing the same in clamping engagement.

7. A fastener for joining a pair of edges of a draper comprising a pair of longitudinally split tubular members adapted to receive the edges of said draper and to securely clamp the same, and a joining member slidable over said tubular members from one end thereof.

8. A fastener for joining a pair of edges of a draper comprising a pair of longitudinally split tubular members adapted to receive the edges of said draper and to securely clamp the same, and a channel shaped joining member slidable over said tubular members from one end and having inwardly turned flanges adapted to embrace said tubular members.

9. A device for joining a pair of edges of a draper, comprising a slide fastener including a pair of abutting strips and means slidable from one end thereof for joining said strips, a pair of bars disposed adjacent opposite sides of said slidable means, and means for securing each of said bars to its associated strip and draper edge, said bars lying above the fabric of said draper to serve as cleats therefor, and being disposed close to said slidable means to protect the latter against stones and the like which may fall upon the draper.

10. A device for joining a pair of edges of a draper, comprising a slide fastener including a pair of abutting strips having upwardly and outwardly turned edges and a channel shaped member having downwardly and inwardly turned edges and slidable from one end of said strips with the edges of said channel member interlocked with the edges of said strips, a pair of bars disposed adjacent opposite sides of said channel member, and means for securing each of said bars to its associated strip and draper edge, said bars lying above the fabric of said draper to serve as cleats therefor, and being disposed close to said channel member and having top surfaces generally flush with the top of the latter, to protect said slide fastener against stones and the like which may fall upon the draper.

RALPH L. ANDERSON.
CARL J. FREDERIKSEN.
ELLSWORTH T. JOHNSON.
LOUIS A. PARADISE.